United States Patent [19]

Rainey et al.

[11] Patent Number: 5,454,301
[45] Date of Patent: Oct. 3, 1995

[54] APPARATUS FOR REMOVING PALM HEART FROM PALM STALKS BY CORING

[75] Inventors: Ronald S. Rainey, Easton; Ian P. Campbell, Rowayton, both of Conn.

[73] Assignee: Barrera; Roberto Gonzales

[21] Appl. No.: 112,969

[22] Filed: Aug. 30, 1993

[51] Int. Cl.[6] ................................................ A23N 4/12
[52] U.S. Cl. .......................... 99/544; 99/542; 99/547; 99/552; 99/537
[58] Field of Search ............................ 99/537–546, 547, 99/552, 564, 565, 510; 426/481–484

[56] References Cited

U.S. PATENT DOCUMENTS

| | | | |
|---|---|---|---|
| 341,514 | 5/1886 | Spedding | 99/544 |
| 2,243,025 | 5/1941 | Wilson | 99/547 |
| 2,433,125 | 12/1947 | Kane, Sr. | 99/544 |
| 3,468,355 | 9/1969 | Hall | 99/537 |
| 3,568,743 | 3/1971 | Dulieu | 99/544 |
| 4,606,263 | 8/1986 | Ross et al. | 99/542 |
| 4,653,393 | 3/1987 | Ross | 99/542 |
| 4,718,333 | 1/1988 | Pierce et al. | 99/589 |
| 4,741,265 | 5/1988 | Cushman | 99/544 |
| 5,060,563 | 10/1991 | Plant et al. | 99/589 |
| 5,067,397 | 11/1991 | Healy | 99/544 |

*Primary Examiner*—Timothy F. Simone
*Attorney, Agent, or Firm*—William G. Rhines

[57] ABSTRACT

Apparatus and methods are disclosed for removing palm hearts from the tapered and "meristem" sections of cut lengths of stalks of palm, each of which had included a large "meristem" section joined to a smaller diameter top section by an intermediate tapered section, and had a palm heart that runs the length of the stalk as a core member inside an intermediate layer that is surrounded by a thorny outer bark layer. After removal of the smaller diameter section from the remainder of the stalk, the remaining tapered and "meristem" sections are caused to be retentively positioned in coring means by which, backed by means for retaining the work piece in position, a coring knife moves substantially coaxially to the piece from one of its ends to core out and remove the palmheart core from the remainder of the work piece. Embodiments include such means per se and methods for carrying out the foregoing processes.

2 Claims, 5 Drawing Sheets

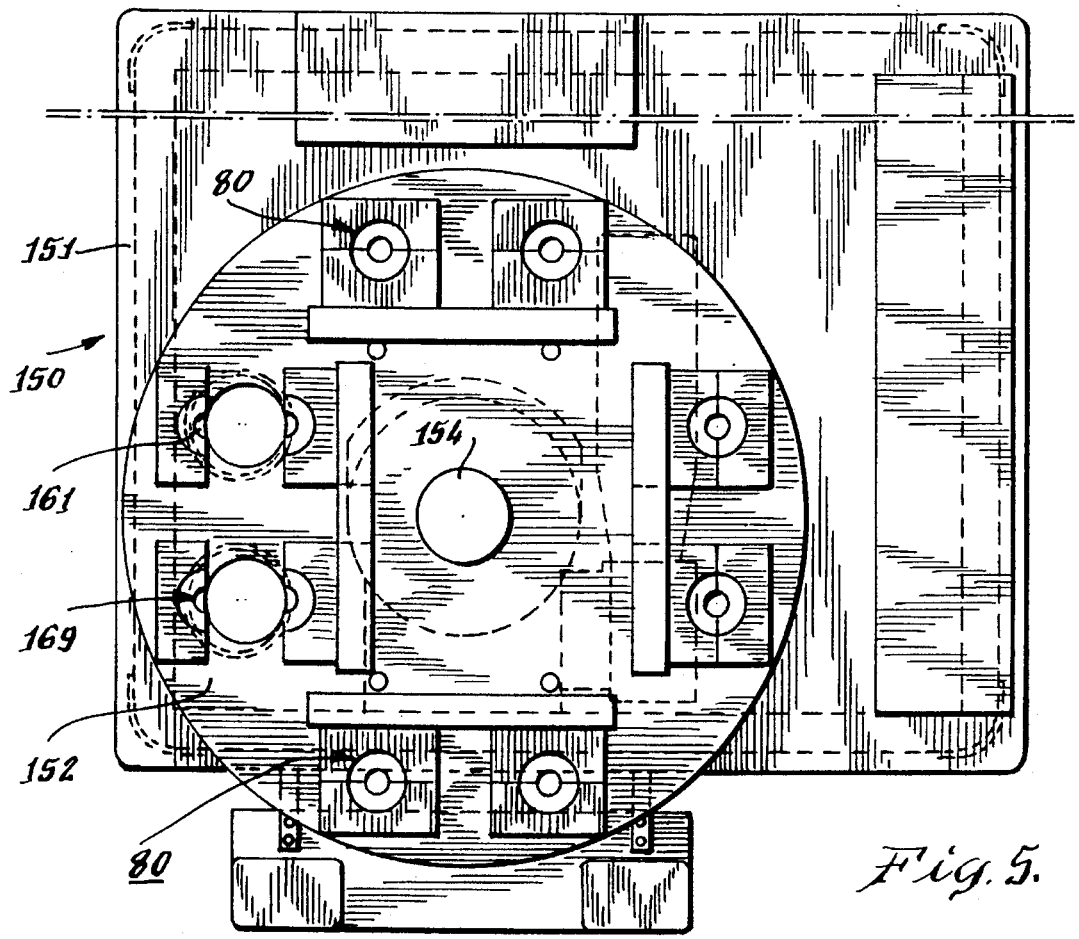
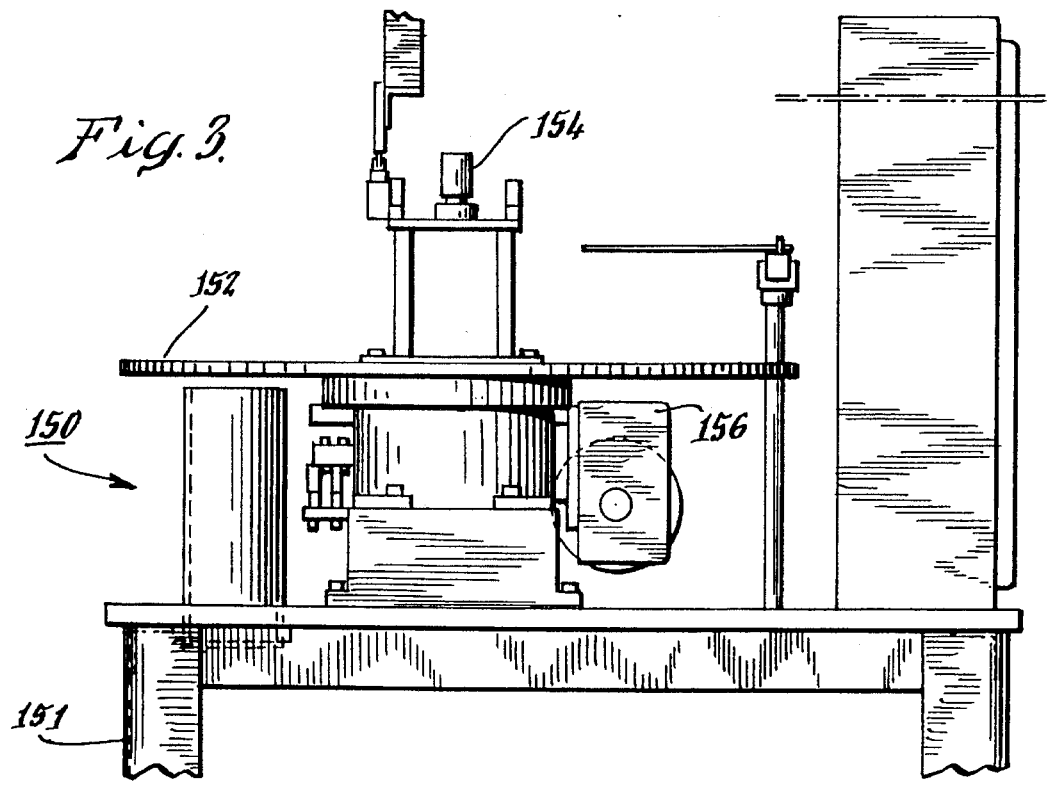

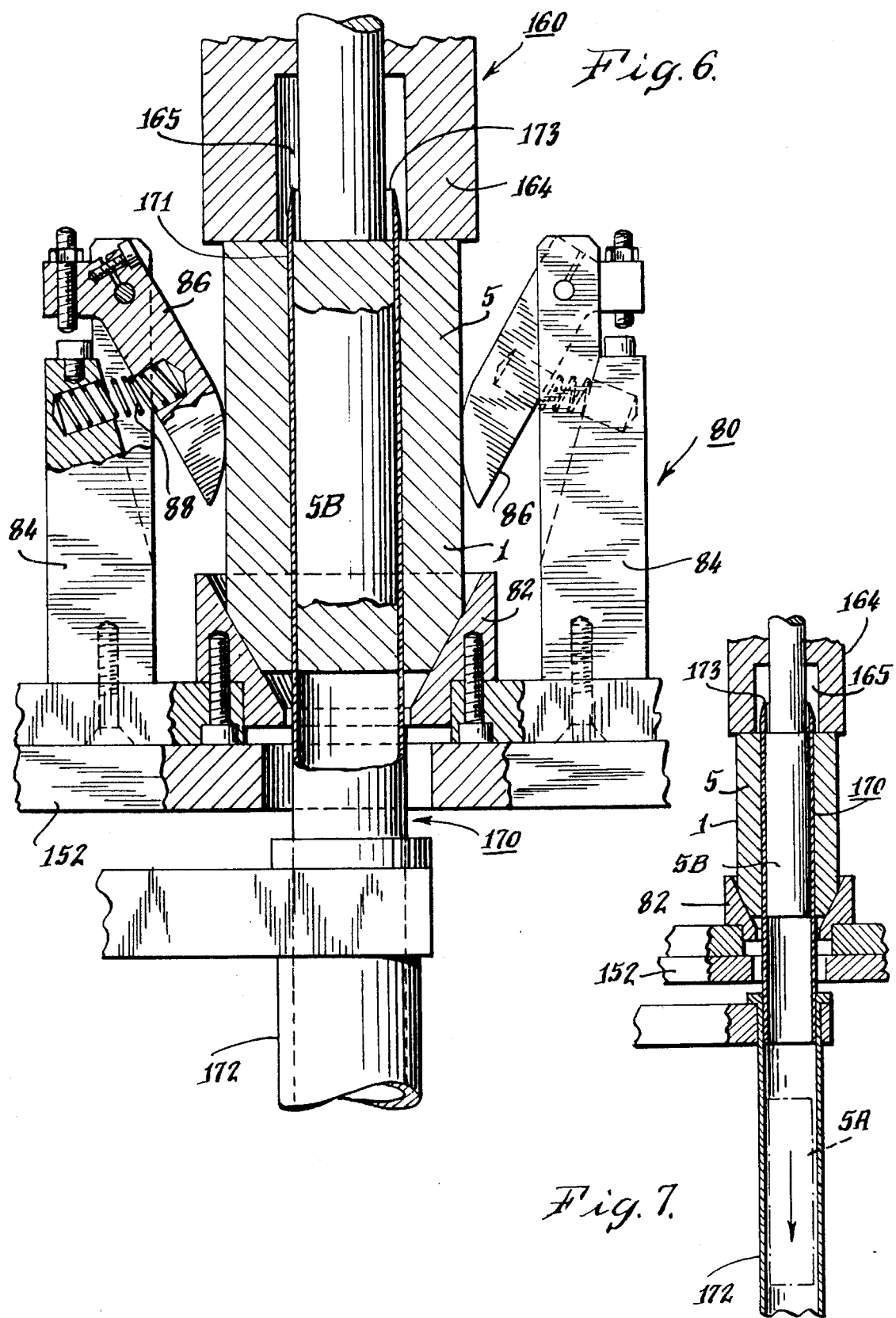

APPARATUS FOR REMOVING PALM HEART FROM PALM STALKS BY CORING

BACKGROUND OF INVENTION

In certain parts of the world, such as France and Brazil, the "heart" or center portion of the stalk of the palmetto palm tree is considered a great delicacy for human consumption. Until now, it has, for the most part, been harvested in the wild, primarily in Brazil, where it is packed fresh in tins for domestic consumption and for export.

The palmetto palm comprises a "meristem" portion, which is the lowest (approximately) 1.5 meters (4.9± ft.) of the exposed portion of the growing plant, and, above that, a main stalk portion, of which about ⅔+ meter (2.4+ ft.) is useful as a source for palmheart extraction. The meristem portion of the stalk is normally significantly larger in diameter (i.e., it is about 7.6 cm. or 3 inches) than is the upper portion of the exposed stalk, which is about 5.1 cm. or 2 inches in diameter. The two sections are connected by a tapered section of stalk which, in cross section, is roughly in the shape of an inverted, truncated cone. The processing steps for recovering palmheart sections traditionally have included field cutting an approximately 1 meter length of stalk from that portion of growing plant which includes a portion of the upper, main stalk that is about ⅔ meter (2.4 ft.) in length, and about ⅓ meter (1.2 ft.) of the upper part of the meristem portion, and the interposed tapered section, all as one piece. The object in such harvesting and the subsequent processing which takes place is to recover the very inside, or "heart" of the stalk from the entire harvested length. That traditionally has been done manually, using a knife to slit longitudinally the bark and the intermediate layer of the upper stalk portion, and by coring the meristem portion.

The narrower portion of the cut length of stalk is more or less round in cross section and has an outer bark layer which, while not as hard as some tree bark, is nevertheless very firm and tough. Therefore, the existing practice, as a prerequisite to removing the bark layer, is to steam the field-cut stalks in an autoclave for about ½ hour at about 125 degrees C. to soften the outermost or bark layer. More significantly, however, as harvested, the stalks are covered on the outside with fairly long, very sharp thorn-like projections. Even though they tend to lie at a shallow angle to the surface of the stalk rather than at right angles to it, these projections make the stalks difficult to handle and process. The outer bark layer encloses an intermediate layer which is also more or less circular in cross section, tough (but less tough than the bark layer), and, in the upper portion of a stalk whose outer diameter of the bark layer is about 5.1 cm. (2 inches), is about 3.5 cm. (1⅜ inches) in diameter. The intermediate layer typically is somewhat larger in the meristem portion, while the innermost or palmheart section is substantially of uniform diameter throughout the upper, tapered and meristem sections. The palmheart itself, which lies within the intermediate layer, is more or less circular in cross section and, in the example given, is about 1.9 cm. (¾ inch) in diameter. However, the periphery of the intermediate layer is eccentric with respect to the periphery of the outer bark layer. Further, the palmheart itself is eccentric but with respect to the periphery of the intermediate layer and usually with respect to the outer bark layer also. These circumstances are of less moment as to the meristem and tapered portions because coring type techniques may be used to remove the palmheart from those portions. However, these eccentricities, which (in cross section taken through the stalk) normally are not correspondingly positioned, complicate greatly the harvesting of the heart, particularly from the smaller diameter top section.

Traditionally, removal of the palmheart portions from these upper portions is done by people who use very sharp knives to split lengthwise first the outer bark layer of the stalk which is then torn away from that which underlies it, and then the intermediate layer which is then torn away from the underlying palmheart. The depth of any cut made in either of these layers to remove it from that which is underneath must be made with particular attention so as not to cut through it into the the underlying palmheart portion as well. Further, since the orientation of the eccentricities of the two outer layers is not the same, it is necessary usually to remove the outer and intermediate layers in separate, sequential steps, between which the stalks are reoriented by turning them. By this means, it is assured that the cuts are made through the thickest parts of each such layer, to minimize the possibility of cut-through. This is further complicated by the pronounced increase in the cross sectional "diameter" of the stalk moving past the tapered portion to the meristem portion from the upper or main portion of the stalk. (In the context of his disclosure it is to be understood that rarely is any portion of a stalk truly circular in cross section, but rather usually it is merely irregularly round, and thus by its "diameter" is meant the average of several mean distances taken across its cross-section). Since there is an annular ring in the region of the tapered portion which is comparatively weak that forms the juncture between the tapered portion and the upper portion of the stalk, usually bending the outer bark layer away from the upper part of the stalk which it surrounds causes it to snap at the juncture and separate from the the remainder of the stalk. Thereafter, the upper portion, now consisting of the intermediate layer-covered palmheart portion is severed from the remainder of the stalk and the palmheart is removed from it by linearly slitting its intermediate layer and stripping that layer away from the underlying palmheart core. It is to the phase of coring the palmheart center component from the remainder of the stalk, which consists of the meristem section and the adjacent tapered portion after the upper portion has been severed therefrom, that this invention is directed.

Concurrently with and/or sequentially and independently from those operations, the palmheart may be removed from the remainder of the original stalk, which now consists of the bark covered meristem portion and the adjacent bark covered tapered portion, by coring it out, manually, or by using mechanical means such as a tubular knife that is thrust axially to separate and extract the palmheart portion from it.

Obviously, all of this is very labor intensive, and since the recovered palmheart cannot be preserved for an appreciably length of time, must be done at or very near the place of harvesting. For these reasons, the price for this commodity traditionally has been very high. Recently, there have been efforts to raise palmettos for palmheart harvesting on plantations, to make the growing and harvesting of them easier and less expensive and to facilitate the rapid transport of cut stalks to processing locations. This also produces products of higher quality and better uniformity than can be obtained with cuttings from growth in the wild. The less wide range in "diameter" of plantation stalks, whose ages are more easily unified than is possible with wild stock, has led to interest in automating selected phases of the process, since this also can have the additional advantages of improving the quality of the product and making processing less expensive.

Accordingly, it is an object of this invention to provide means to recover palmhearts from the meristem and tapered portions of palm stalks.

Another object of this invention is to provide such means which is mechanized.

Still another object of this invention is to provide means for satisfying one or more of the foregoing objectives which is adapted to accommodate substantial diameter variations between and within individual palm stalks as they are being processed.

STATEMENT OF INVENTION

Desired objectives may be achieved through practice of this invention, preferred embodiments of which comprise corer apparatus and methods to core the palmheart from the portion of palm stalks which includes the meristem and its connected tapered portion, said corer including means for receiving and positionally orienting such portions of palm stalks, core cutting knife means for automatically coring the palmheart out from such portions and removing it therefrom by being moved axially thereagainst, and actuation means for so moving such knife means.

DESCRIPTION OF DRAWINGS

This invention may be understood from the description which follows and from the accompanying drawings in which:

FIG. 3 is a front elevation view of a palmheart corer machine which embodies this invention, FIG. 5 is a top plan view of the palmheart corer machine as shown in FIGS. 3 and 4, FIG. 6 is a detail cross section drawing of a portion of the mechanism comprising the embodiment of this invention as shown in FIGS. 3, 4 and 5, and FIG. 7 is a cross section drawing of a portion of the coring mechanism.

DESCRIPTION OF PREFERRED EMBODIMENTS

Figure 1A:
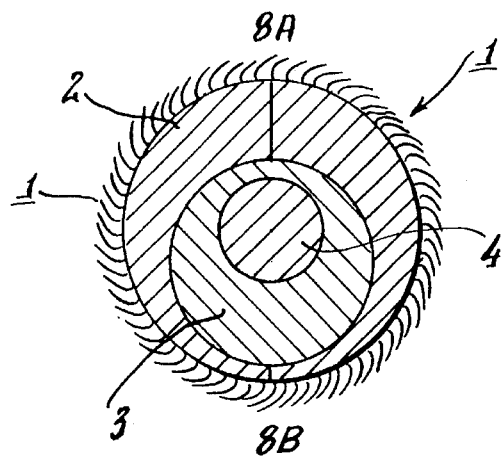
FIGS. 1A through 1D inclusive illustrate cross sectional and side views of products which may be processed by this invention.
Figure 1B:
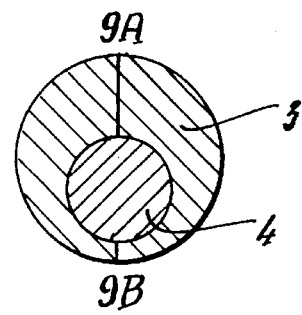

Referring first to FIGS. 1A through 1D inclusive, there are depicted cross sectional and side views of a palm stalk 1 of the type which embodiments of this invention may be used to process. FIG. 1A is a cross section of the main portion of such stalks from which the desired palmheart 4 is to be removed. It consists of an outer layer 2 that is somewhat tough, but also somewhat resilient, and has thorn-like barbs 2A extending from its outer surface. Although shown as being round in cross section, the stalk typically is more or less round, and, in the upper region (i.e., the portion of the stalk immediately above the tapered portion 5 of the growing plant) is about 2+ inches (5.1+ cm.) in "diameter". Within the bark layer 2 is an intermediate layer 3, which, although somewhat less tough and without the thorns which project from the outer layer, also is more or less round and typically, in this region of a stalk of this size, is about 1.37 inches (3.5 cm.) in diameter. However, characteristically, the outer periphery of the intermediate layer 3 is eccentric with respect to the outer peripheral surface of the outer layer 2. Thus, the thickness of the outer layer 2 to varies significantly from place to place radially around the stalk, viewing the stalk in cross section. Within the intermediate layer 3 is the palmheart 4 that is to be recovered. That, too, is more or less circular in cross section, but about ¾ inch (1.9 cm.) in diameter in this region of the example given. However, the outer peripheral surface of the palmheart 4 is also eccentric with respect to that of both the intermediate and bark layers by which it is encased. Further, there usually is no predictable relationship between the degree or position of these two instances of eccentricity, one to the other. For these reasons, in removing the successive layers to get to the palmheart 4, the usual practice is first to make a linear knife cut of the type shown as 8A in FIG. 1A, through the thickest portion of the outer layer 2. This cut usually needs only to be part way through the bark layer, but, although it is not desirable to do so, limited penetration of the knife through to the intermediate layer may occur since ultimately the intermediate layer is discarded. The top position is selected because it provides the most depth for the cut and, therefore, less likelihood of cutting into the intermediate layer at the same time. Optionally, a second linear slit may be cut in the bark layer 2, as shown at 8B, roughly opposite the first cut, to facilitate breaking the bark layer 2 away from that which underlies it. To accommodate the lack of congruence of the eccentricities as between the two layers while still making cuts in the thickest portion of each the stalk is next reoriented by rotating it so that a cut, corresponding to that shown as 9A in FIG. 1B, may be made through the intermediate layer 3, again in its thickest portion. In all instances of making cuts in layers, care is to be exercised to avoid the cuts being so deep as to invade the next adjacent inner layer.

Figure 1C:
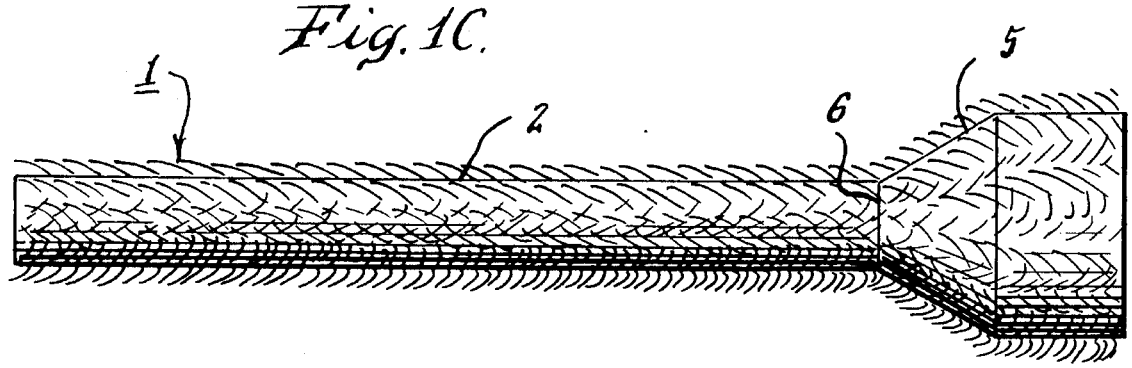
Figure 1D:
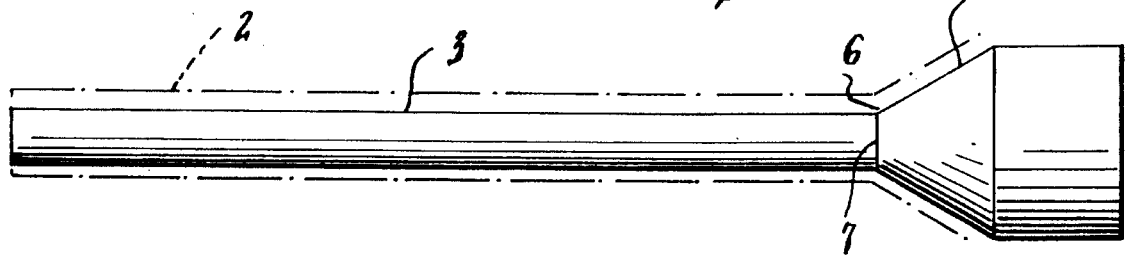

FIGS. 1C and 1D illustrate side views of the same type of stalk. They show, in particular, the tapered portion 5 which is interposed between the meristem portion 7 that, in the growing plant, is closest to the ground, and the upper portion 1 which joins the tapered portion 5 at a comparatively weak annular ring 6 in the outer bark layer. In order to ensure maximum retrieval of useful palm heart, the top part 7 of the meristem is out as part of the harvested palm stalk, the difficulties in handling it notwithstanding. It is particularly to be noted that the annular ringlike region 6 in the outer bark layer 2 at the juncture between the tapered portion and the upper portion of the stalk is more susceptible to breaking upon being flexed than is the rest of the outer layer 2. As will be apparent from what follows, this is a characteristic upon which embodiments of this invention capitalize.

Figure 2:
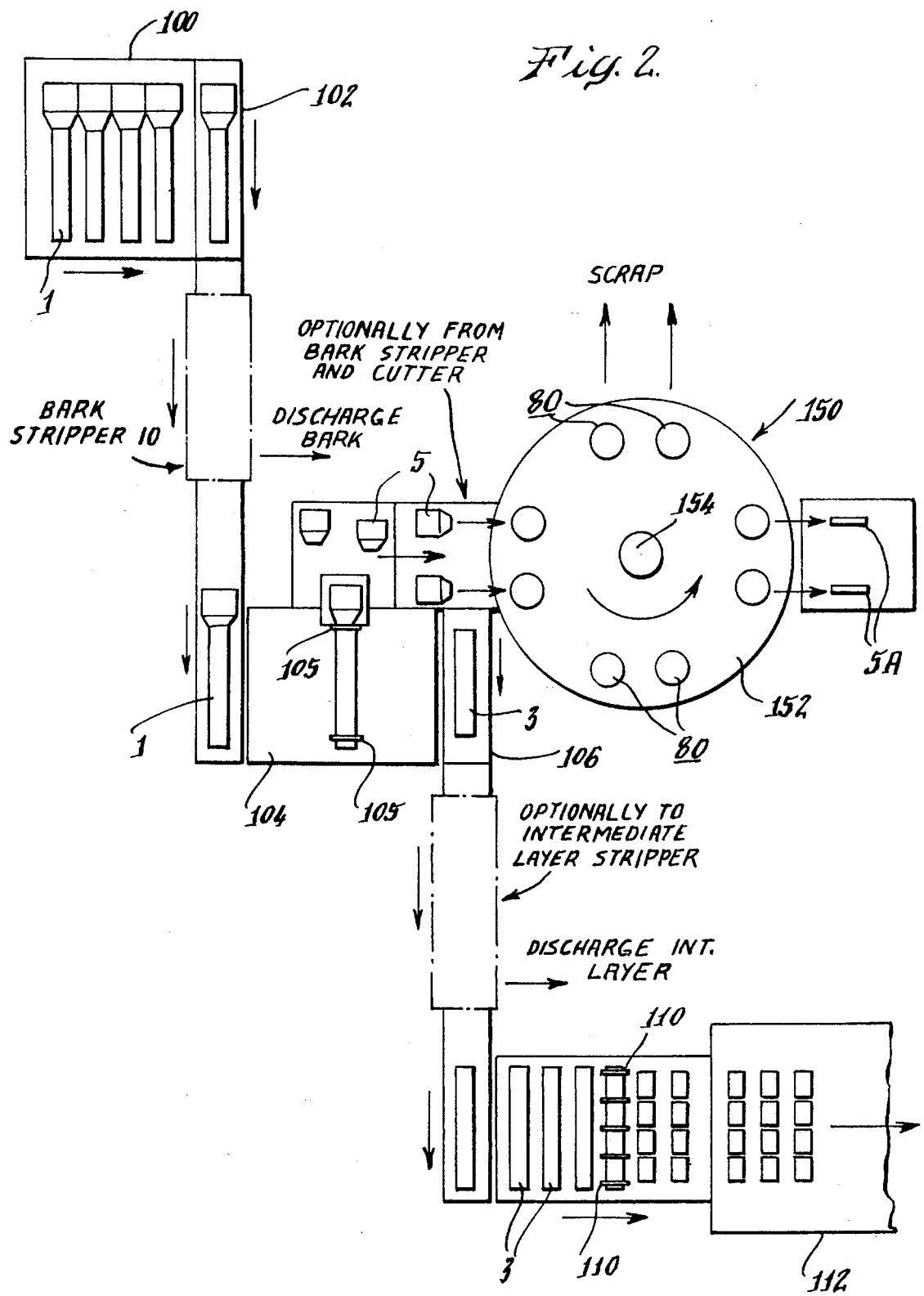
FIG. 2 is a schematic plan view of production apparatus utilizing an embodiment of this invention.

FIGS. 2 through 7 illustrate an embodiment of this invention which is adapted for use in recovering the palmheart section from cut lengths of palmetto palm stalks. As shown at the top of FIG. 2, raw palm stalks 1 are fed by conveyers 100, 102 to a bark stripper 10. They have been cut in the field in continuous lengths, each of which includes a relatively small diameter top portion of the stalk, a relatively larger diameter meristem portion, and an intermediate tapered section connecting the two. After the outer bark layer in the smaller diameter top section has been removed in the bark stripper 10, that bark is discharged. The palm stalk, which now consists of the de-barked smaller diameter top portion still attached to the intermediate tapered and larger diameter meristem portions with the bark still on them, is passed to a cutter 105 in which the smaller diameter top portion is severed from the remainder. That remainder is moved by conveyors to a corer device 150, which embodies this invention, where its palmheart center is removed by a coring operation and the remainder is discarded. The palmheart pieces so recovered may then be passed to other conveyors by means of which they are carried to a second cutter device where they are cut to desired lengths and then put through a scalder to stabilize them organically before they are packed. Optionally, the smaller diameter upper stalk portions which, following the initial bark-stripping operation, include the inner, palmheart core and its surrounding intermediate layer, may be carried by a conveyor to an intermediate layer stripping device 200 where the intermediate layer is removed and discarded. The palmheart core that is left may be carried to a cutter device 110. There it is cut to desired lengths and then put through a scalder to stabilize it organically before they are packed.

Figure 4:
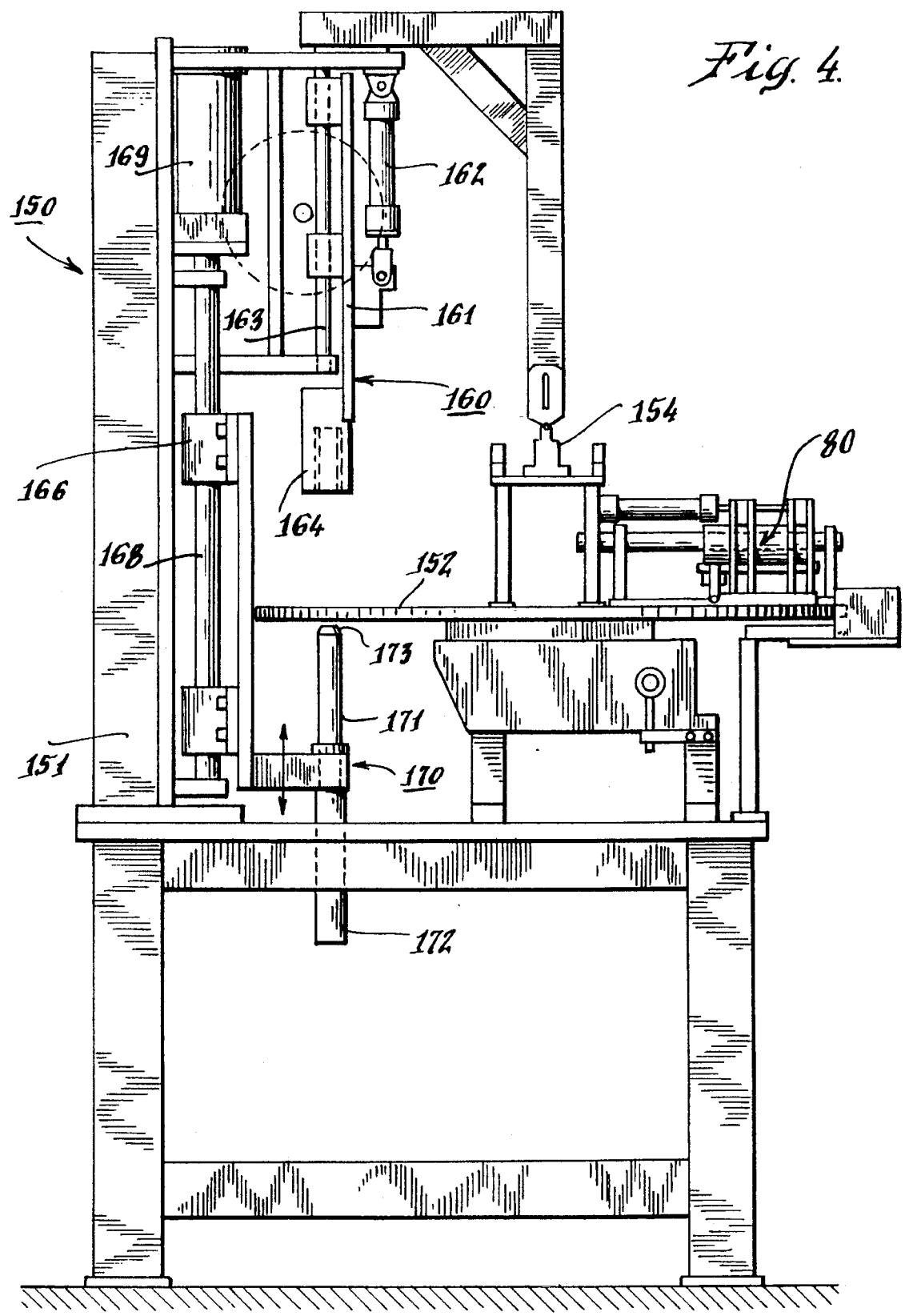
FIG. 4 is a side elevation view of the palmheart corer machine as shown in FIG. 3.

The stalk segment as previously described of the interconnected tapered and meristem portions, is, as has been noted, passed on to a coring device 150, such as that now described, which embodies the present invention. FIGS. 3, 4 and 5 are, respectively, front and side elevation views, and a top plan view of a such a palmheart corer. It includes a machine frame 151 which supports a rotating table 152 that is driven by a motor 156. The top of the table 152 supports several fixtures 80 (eight of them, are shown in FIG. 5) which will be described in greater detail later. At the back of the table 152 are coring backing assemblies 160, each of which includes a backing plug 164. It is possible for such backing plugs to be positionally fixed or swung into backing position, so that while the corresponding end of a palm stalk segment is aligned with it, the thrust of the coring knife as hereinafter described will close any gap between the end of the segment and the backing plug. However, since the stalk segments usually are of irregular length, in a preferred arrangement, each such plug 164 attached to a plate 161 that is moveable vertically on a bar 163 by means of an actuating pneumatic cylinder 162, thereby enabling a backing plug 164 to be moved into and out of position as hereinafter described.

Positioned beneath the table 152 is a coring mechanism 170. As shown in FIGS. 4 and 6 in particular, the coring mechanism 170 includes a hollow, cylindrical tubular cutting knife 171, the top edge of which has been sharpened to form a substantially round coring knife blade 173. This is positioned above a discharge tube 172 and may be actuated vertically and by means of linkage 166 moving along bar 168 through operation of a pneumatic cylinder 169. The interior configuration of the backing plug 164 is to be noted as shown in FIG. 4 which depicts the backing assembly in the "open" position, and in FIGS. 6 and 7 which depict the backing assembly 160 in the "closed" position. In the latter ("closed") position, the backing plug 164 has been moved downward to bear against the meristem end of a tapered/meristem section 5 of a palm stalk to hold it in a vertical ("standing on end") orientation. At the same time, the coring knife 171 has thrust upward until its top knife edge 173 is positioned in the annular depression 165 in the bottom end of the backing plug 164, in order to perform the desired coring operation by disassociating and removing the palmheart core segment 5A from the intermediate and bark layers of the meristem/tapered portions which surround it. The segment A so removed is retained within the knife 171 until, as is shown in FIG. 7 in particular, the next cutting cycle when the segment 5B then cored acts as a ram to push segment 5A downward within the tubular knife. Typically, up to two such segments may be retained within the tubular knife until a third segment is cored, at which point the tubular knife is over filled, so that the newly cored third segment, acting via previously cored segments residing within the knife, pushes the originally cored segment 5A free from being retained by the tubular knife, causing it to fall freely via the guide tube 172 into a collection container.

FIG. 6 also illustrates details of the fixtures 80 that are affixed to the top of the table 152. Each such fixture 80 includes a receiving socket 82 which has a conical seat into which the upper surface of the tapered portion of an inverted palm stalk may be positioned. This socket member 82 is formed in two halves which can be moved apart from each other as hereinafter described. Each fixture 80 has four sets of support members, each of which includes a vertical support post 84, a retention dog 86, and a spring bias means 88 by means or which the bottom of each dog is biased toward the center of the fixture. By this means, an inverted tapered portion of a palm stalk that is placed in the fixture may be retained in that position.

In operation, a machine operator (manual or mechanical) positioned at the front of the table, places the tapered portion of an inverted palm stalk section in two adjacent fixtures 80 at the same time. An electronic programer then causes the table to rotate 90 degrees (e.g., from the left), so that the operator can place two more such palm stalk sections into the two empty fixtures which have now moved (in this example, from the left) so as to be in front of the operator. The table again turns 90 degrees and two more stalk sections are similarly inserted; and so forth. When the first two stalk sections are positioned at the location of the coring assemblies 160, the backing plug 164 comes down to abut the top end of the inverted palm stalk sufficiently tightly for it to hold the stalk in place against the upward thrust of the cylindrical coring knife 171. If the tubular knife contains a sufficient number of palmheart segments from previous coring sequences, when the coring knife 171 has moved upward, the bottommost among the palmheart core segments will be pushed out of the cylindrical knife by the coring operation and allowed to drop into a container or onto a conveyor belt to be carried away for further processing. The backing plug and coring knife are then withdrawn, the former upward and the latter downward, so that the table is free to make its next quarter-revolution. Such machine motions also occur in response to the programmer having actuated the drive motor. The table then makes another quarter turn, upon completion of which the previous operations again occur on palm stalks that were later positioned in the machine. However, since the fixtures 80 after each coring operation still contain the cored-out remains of the meristem/tapered portions of the palm stalks, the halves of the receiving socket 82 in each are opened up through operation of valving 154 so that those remains drop out by gravity for subsequent disposal.

From the foregoing it will be seen that it is possible, through practice of this invention, to harvest, process and package palmheart automatically, accommodating the wide variety in physical conditions which are typical in such products. Accordingly, it is to be understood that the embodiments of this invention herein illustrated and discussed are by way of illustration and not of limitation, and that a wide variety of embodiments may be made without departing from the spirit or scope of this invention.

We claim:

1. Apparatus for removing palmheart from a stalk of palm that includes the co-joined tapered and larger diameter meristem sections, comprising a coring backer means, a tubular coring knife means, one end of which has a cutting edge facing said coring backer means, which coring backer means and tubular knife means are moveable toward and away from each other, at least one socket means that is mounted on moveable table means and is adapted for receiving and positionally retaining a tapered section of a stalk of palm that is co-joined to a meristem section of said stalks, and motion means for moving said table to cause said socket means to be positioned so that a stalk of palm retained therein is in alignment with, in contact accessibility to, and interposed between, said cutting edge and said coring backer means, and actuation means for causing sequentially, while said socket means is so positioned, said coring knife to move toward said cutting edge of said tubular cutting means to contact a stalk of palm positioned in said socket means, said cutting edge of said tubular knife means to move toward and into proximity with said coring backer means, and said coring backer means and said tubular knife means to be moved away from each other.

2. The apparatus described in claim 1 wherein is included at least one of the structures from the group consisting of: pivotally mounted segments by means of which palm stalk may be retained and released from said socket means as part of said socket means; an inverted conical seat for receiving a tapered section of palm stalk facing down, as part of said socket means; table means which includes a multiplicity of socket means; and coring backer means which includes a seat for receiving the knife edge of said coring knife when said coring knife has been moved into proximity with said coring backing means.

* * * * *